(12) United States Patent
Eromaki

(10) Patent No.: US 6,837,285 B2
(45) Date of Patent: Jan. 4, 2005

(54) PATTERN BLOCKS IN THE TREAD OF A TIRE

(75) Inventor: Pentti Juhani Eromaki, Nokia (FI)

(73) Assignee: Nokian Tyres PLC, Nokia (FI)

( * ) Notice: Subject to any disclaimer, the term of this patent is extended or adjusted under 35 U.S.C. 154(b) by 245 days.

(21) Appl. No.: 09/864,925

(22) Filed: May 23, 2001

(65) Prior Publication Data

US 2002/0007889 A1 Jan. 24, 2002

(30) Foreign Application Priority Data

May 23, 2000 (FI) .............................................. 20001234

(51) Int. Cl.[7] .............................................. B60C 11/12
(52) U.S. Cl. ........................... 152/209.18; 152/209.28; 152/DIG. 3
(58) Field of Search ....................... 152/209.18, 209.28, 152/DIG. 3

(56) References Cited

U.S. PATENT DOCUMENTS

| | | | |
|---|---|---|---|
| 4,055,209 A | | 10/1977 | Senger |
| 5,176,765 A | * | 1/1993 | Yamaguchi et al. |
| 5,591,280 A | | 1/1997 | Asano |
| 5,711,828 A | * | 1/1998 | Himuro ................. 152/DIG. 3 |
| 6,382,283 B1 | * | 5/2002 | Caretta |

FOREIGN PATENT DOCUMENTS

| | | | |
|---|---|---|---|
| DE | 2 253 717 | | 11/1972 |
| DE | 25 49 668 | | 11/1975 |
| DE | 35 40 669 A1 | | 11/1985 |
| DE | 39 43 014 A1 | | 12/1989 |
| EP | 0 125 437 A1 | | 3/1984 |
| EP | 775600 | * | 5/1997 |
| EP | 0 911 187 A1 | | 3/1998 |
| EP | 0 881 103 A1 | | 4/1998 |
| EP | 0 968 849 A2 | | 6/1999 |
| EP | 1 070 606 A2 | | 7/2000 |
| GB | 869 980 A | | 6/1961 |
| GB | 1 254 699 | | 11/1971 |
| JP | 63-278807 | * | 11/1988 |
| JP | 7-40710 | * | 2/1995 |
| JP | 8-244418 | * | 9/1996 |
| JP | 8 276 709 | | 10/1996 |
| JP | 2000-289413 | * | 10/2000 |
| JP | 2000289413 | | 10/2000 |

* cited by examiner

Primary Examiner—Steven D. Maki
(74) Attorney, Agent, or Firm—Klarquist Sparkman, LLP (57) ABSTRACT

The invention relates to pattern blocks in the tread of a vehicle tire, the tread comprising the tread layer (20) on the tire carcass (25) and on that pattern blocks (1) separated from each other by wider grooves (21). At least part of these pattern blocks comprise fine slits (2), which are substantially narrower than the grooves, each slit comprising within the area (A1) of the pattern block at least one bend (5) or at least one end (4). Two adjacent slits (2) form surface tear points (10), each of which is formed of: webs (3a, 3b) between at least one end (4) of one slit and at least one second slit or its end; or webs (3c, 3d) between the bend of one slit and one second slit or its bend (5). The web width (W2) of the webs is at most five times the slit width (W2), and the adjacent slits restrict between their mutual webs (3a–3d) between them nubs (8) inside the pattern block.

17 Claims, 3 Drawing Sheets

Fig. 1

PATTERN BLOCKS IN THE TREAD OF A TIRE

The present application claims the benefit of Finish Application No. 20001234, filed May 23, 2000.

The present invention relates to pattern blocks in the tread of a tire, comprising a tread layer of one or several rubber materials on the texture of the tire, and pattern blocks separated from each other by wider grooves in this said tread layer, and fine grooves substantially narrower than the said grooves at least in part of these pattern blocks, each of the fine grooves comprising at least one bend or at least one end within the area of the pattern block.

At present, typically very narrow, differently shaped slits, which are also called fine grooves, capillary slits, or lamellae, are used in the patterning of the tread of tires in cars, delivery vans and trucks as well as other similar vehicles, which are meant to be used in winter conditions and which thus have to have a good grip both on ice, in snow and in slush. In distinction from grooves in the tread, which separate the pattern segments to work separately independent from each other, the internal slits in the pattern segments are so narrow that the sections of the pattern segment on two sides affect each other during driving. Such slits have been decreed, for example, in the publications EP-0 881 103 A1 and EP-0 125 437 A1, in which it is suggested that long bending slits be used, the shape of the slits being different at different places of the tread thickness. The purpose of the first publication is to make it possible to provide the pattern segments with a large number of slits and to retain the number and length of these slits also as the tire wears during use. In the latter publication, the shaping of the slits is meant to prevent the tearing of the webs between adjacent slits, which may be caused by deformations in the pattern segments during the use of the tire.

The publication DE-25 49 668 discloses short hook-shaped slits which are arranged in different positions and which do not extend to the grooves between the pattern blocks, but which are found entirely inside the pattern blocks. The publication DE-2 253 717 discloses also hook-shaped, and additionally V-shaped and zigzag-shaped relatively short slits, of which only one is found in each pattern block according to some applications indicated in the figures of the publication; according to some other applications, several such slits may be included in one pattern block so that they are arranged in line in accordance with the principal direction of the slits or in line transverse to the principal direction of the slits. According to the publication, the several slits in the same pattern block are generally placed at a relatively long distance from each other especially when the line direction of the slits is transverse to the principal direction of the single slits. In one alternative the slits in the same pattern block are arranged as extensions to each other so that the slits are not in the least overlapping, but their ends are rather close to each other. The influence of the shapes and positions of the slits is not disclosed in the publication, but according to the publication it is essential that the surface pattern contains sections in the circumferential direction of the tire that differ from each other in relation to the number of the surface profile units and grooves per area unit and/or contour shapes and/or size and/or arrangement. The purpose is here to reduce noise from the tires and to provide sufficient grip on different road surfaces and in different weather conditions, such as in snow and on ice. Both the treads according to the publication DE-25 49 668 and the publication DE-2 253 717 contain very few of these slits, i.e. fine grooves, and the suggested surface patterns of the tread do not provide anywhere near the sufficient grip properties according to the present level of requirements.

The object of the invention is to provide such a tread for the vehicle tire, which provides the tire with good grip on a road surface with ice, slush, or snow, and which retains these grip properties as well as possible also as the tire wears out, i.e. the tread becomes thinner. The second object of the invention is to provide such a tread, also the other driving properties of which are good both as new, i.e. unworn, and as worn, even if the rubber material used for the tread were relatively soft, i.e. flexible rubber material.

One important advantage of the invention is that each pattern block can be provided with the desired big or relatively big number of slits so that the grip of the tire can be made excellent, but however so that the sections of the pattern block separated from each other by slits in an unworn tread are kept sufficiently strongly or rigidly together, thus making the driving behaviour of even a new tire excellent and not too yielding, for example, in the changes of the driving direction, i.e. the tire is not "sluggish", even as new. Another advantage of the invention is that, as the tire wears down, for example, the effective number of slits remains at least almost unchanged, i.e. the number or the effective length of the slits is not reduced decidedly or to a harmful extent, so that the grip properties remain good in snow, slush, and on ice. This also provides the tread with a roughening or pilling property continuing substantially until the end of the operating life of the tire so that points projecting into the small inequalities of the road surface and thus increasing the grip are generated onto the tread.

The invention is next decreed in more detail referring to the enclosed drawings, in which.

Besides the components not decreed in this specification, the vehicle tires filled with air comprise, among others, the carcass 25, which nowadays typically contains a radial texture in the area of the tread, and on top of the carcass a tread layer 20 manufactured of one or several rubber materials. This tread layer 20 comprises pattern blocks 1 separated from each other by wider grooves 21, and at least in part of these pattern blocks fine slits 2 or capillary slits or fine grooves or lamellae (the terminology is not completely established) or simply just grooves 2, which are essentially narrower than the said grooves, each of the slits comprising at least one bend 5 or at least one end 4 within the area A1 of the pattern block. The grooves 21, the pattern blocks 1 and the slits 2 form together with possible circumferential ribs 17 the surface pattern of the tread. The tread grooves 21 refer to grooves, the groove depth H3 of which is sufficiently large and the groove width W4 so large that the side edges 19 of the adjacent pattern blocks 1 separated from each other by the groove do not at least to a substantial extent contact each other during the use of the vehicle tire, i.e. during driving, even during a change in speed and/or direction. Thus, the pattern blocks do not rest on each other more when the tire is stationary than during accelerations, decelerations or changes in direction, but the pattern blocks can elastically deform at least generally independently, irrespective of the other pattern blocks and their deformation. This can be understood from FIG. 9, in which a broken line presents block patterns 1 that have been somewhat deformed elastically, and the groove 21 between them. The groove width W3 of the grooves 21 is generally at least 5 mm or more, when vehicle tires, especially tires for cars or delivery vans or trucks are concerned.

Things are different when slits 2 included in the pattern block 1 are concerned, the slit width W2 of these slits being designed so small that the different sections of the same pattern block on the opposite sides of the slit 2 rest on each other during a change in speed and/or direction. In this case, the opposite sides 16a and 16b of each slit 2 in the pattern block 1 come into contact with each other from a smaller or wider area at least during accelerations or decelerations or changes in direction, and thus the sections in the pattern block separated by the slit/slits, in the tread of the invention the nubs 8, support each other in driving situations including changes. During the said changes in speed and/or direction, the nubs 8 in the tread on two sides of the slit 2 recline in relation to the circumferential surface of the tire in rest condition, and their outer surfaces 22 form the zigzag-shaped or wavelike form, seen in FIG. 10, thus offering improved grip points to the base, which furthers the grip of the tire. The slit width W2 of the slits 2 is typically at least about 0.1 mm or at most about 1.5 mm, such as 0.3 mm–0.8 mm, although even smaller or, for example in truck tires, wider slits are possible. The possible slit width W2 is influenced by the thickness of the tread, or in other words, the slit depth H3 so that in a tire with a bigger groove depth, wider slits 2 can be used than in a tire with a smaller groove depth, because the deflection of the pattern block 1 is bigger with the same force, and thus the sides 16a, 16b of the slit become more easily into contact with each other, even if their distance, i.e. the slit width were bigger when the slit depth H3 is big, as compared with a case in which the slit depth would be smaller.

According to the invention, at least part of the pattern blocks 1 comprises surface tear points 10 between at least two adjacent slits 2. In this specification, the universal reference number 2 is used of the slit in a case when reference is made to the slit in general, and its features are not defined; the specific reference numbers 2a–2e are used in a case when reference is made to a slit of a certain type. According to the first principle of the invention, each surface tear point 10 is developed from webs 3a, 3b between the end 4 of at least one slit 2 and at least one second slit 2 or its end 4. Alternatively, according to the second principle of the invention, each surface tear point 10 is developed from webs 3c, 3d between the bend of one slit 2 and one second slit 2 or its bend 5. In addition, the web width W3 of the said webs 3a–3d in the surface tear points 10 is at most five times the slit width W2 of the slit 2a–2e, and two adjacent slits 2a–2e further restrict between their mutual webs 3a–3d within the pattern block 1 nubs 8 with an area A1. Here, the web width W3 refers to the distance between adjacent slits, as can be seen from the Figures. In the surface tear points 10, the webs 3a–3d also have a web thickness P3, which is a measure perpendicular to the web width W3, based on the projection of the slit width W2 of the slit to the level parallel to the web width at that point. In the embodiment in FIGS. 2A, 2C, 2D, 4 and 7, the web thickness P3 is approximately equal to the slit width W2; in the embodiments in FIGS. 2B and 3 slightly smaller; in the embodiments of FIGS. 5B, 6 and 7A about $2\times W2/\sqrt{2}$, if in the bends described later, the slits 2b, 2d form a right angle, and in the embodiments in FIGS. 5A and 8, approximately half of the former. Rather generally, although not always. the web thickness is $P3=W2/\sin \delta$, in which the angle $\delta$ is the angle between the direction of the web width of the slit and the slit coming to it, and double compared with this in a case, in which several slits come to the surface tear point. If the slits between the surface tear points 10 are straight, the angle $\delta=\alpha$. In the embodiments of FIGS. 7B and 7C, the web thickness is approximately equal to the web width W3. It is obvious that the values for the web width W3 and web thickness P3 deviate from the ones told, in a case in which the shape of the slits 2 deviates from the ones shown in the Figures, as can be the case according to the invention.

In the surface tear points 10, the web width W3 and the web thickness P3 are dimensioned according to the rubber material or rubber materials of the tread 20 so that, as the tyre is used during driving, the pier or ridge or web 3a–3d of the invention tears into a certain depth H1, starting from the respective outer surface 22 of the tread, the tear depth H1 being substantially smaller than the groove depth H3 and the slit depth H2. According to the invention, the tear depth H1 should be at least 0.5 mm and at most 1.5 mm of the outer surface 22 of the tread. Preferably the tear depth H1 is near to 1.0 mm, such as 0.8 mm–1.2 mm. This tearing of the web 3a–3d can be understood with the help of FIGS. 9 and 10. As the pattern block 1 bends due to the influence of the change in speed and/or direction of the tyre, a larger deformation occurs in the section of the height of the pattern block, which corresponds to the slit depth in question at a given time, this section being closer to the outer surface 22 and ending to this outer surface, than in the part of the pattern block which is closer to the tyre carcass 25. In the said section near the outer surface 22 and ending to the outer surface, the dimension of which is the said tear depth H1, a shear stress parallel with the slit depth H2 of the slit 2a–2e is generated to the web 3a–3d due to bending, the stress exceeding the tear strength of the rubber material on this restricted area, because of the predetermined relatively small cross section of the web determined by the web width W3 and the web thickness P3. Thus, the tread of the tyre contains also upon wearing out, i.e. as the groove depth H3 and the slit depth H2 decrease, a tear of the web 3a–3d extending generally always to equally big tear depth H1 from the prevailing outer surface, i.e. the web is in fact removed from the outer surface 22 to the depth H1. On the dimension H4 of the rest of the slit 2a–2e, the size of which is thus H2-H1, the deformation of the pattern block 1 is smaller, and the shearing force parallel to the slit is thus considerably lower so that the tear strength of the rubber material is not exceeded, but the web remains unbroken. This configuration of the tread of the invention has the special advantage that the grip properties of the tyre tread are completely or almost identical to those of a tread which would contain continuous and fi.illy open slits and between them tilting or bending rubber sections, such as nubs 8 of the invention, etc.; but simultaneously, also the second advantage is achieved that, in the lower part of the webs, on the dimension H4, the webs further connect the opposite sides 16a and 16b of the slit to each other so that the total rigidity of the pattern block 1 is identical to or at least close to the rigidity of such a pattern block which has no slits, which again reduces the wandering of the tyre during driving. The webs 3a, 3b, 3c, 3d forming the surface tear points thus connect the adjacent nubs 8 to each other from the bottom 23 of the slits 2 towards the outer surface 22 of the tread from the height of the said measure H4, the measure H4 decreasing as the tyre wears out at the same time as also the slit depth H2 decreases. On each wear level of the tyre, the decreasing measure H4 is smaller than the prevailing decreasing slit depth H2. Thus advantageous effects are achieved, which traditionally have been considered as conflicting or excluding each other.

Besides the matters mentioned above, it can be stated about the dimensioning of the said piers or ridges or webs 3a–3d that the web width W3 is preferably at most four times the slit width W2, or at most two times the slit width. In experimental checks with a certain tire type it has been found that the tread works in the way referred to above also when the web width W3 of the webs 3a–3d is substantially equal to the slit width W2. The web thickness P3 of the said webs 3a–3d again is at most three times the slit width W2 of the slit, or at least half of the slit width. In experimental checks with a certain tire type it has been found that the tread works in the way referred to above also when the web thickness P3 of the webs 3a–3d is 0.8×–1.5× the slit width W2. Reducing the web thickness to be smaller than the slit width requires special design of slits, not decreed in detail here—their local narrowing —in the surface tear points 10. In this case it naturally has to be noted that the dimensioning of the webs 3a–3d depends of the type of the rubber material for the tread 20, especially on the flexibility and tear strength of the rubber material, and of course of the type and size of the tire. As the flexibility, i.e. elasticity of the rubber material increases the shearing stress increases, which would require that the webs be made thicker if the tear strength remained unchanged, and in a reversed case, as the elasticity decreases, the shearing stress decreases, which should make it possible to make the webs narrower. In practice, the situation is rather complicated, because most often the elasticity and tear strength of rubber are not independent from each other. At present it is believed that the dimensions determined above are either right or at least indicative, but because of the large number of effective factors and mutual dependence, smaller or bigger deviations may occur. For achieving sufficient symmetry, it is expediently estimated that the web width W3 and the web thickness P3 deviate from each other at most ±50%. As the present practical values it can be stated that the web width W3 of the webs is at most 1.5 mm and at least 0.3 mm, or the web width is preferably 0.5 mm–1.0 mm and that, respectively, the web thickness P3 of the webs is at most 1.3 mm and at least 0.2 mm, or preferably 0.4 mm–0.9 mm.

The surface tear points 10 decreed above are thus provided onto the tread of a tyre by arranging to it points with small cross-dimensions, to which the stresses caused by the deformations of the tread and especially of the pattern blocks 1 during driving are directed. When forming these surface tear points it is advantageous to utilise the ends 4 of the slits 2 and/or bends 5 of the slits 2, as will be decreed later in connection with certain forms of embodiment. In the surface tear points 10 it is preferable to use relatively sharp bends 5, as in the figures, for directing the stresses decreed above to a sufficiently restricted area, but also somewhat curved bends 5 may be applied. The said bend 5 is alternatively either the angle 5=5a, the sides of which are formed by the slit, and of which the slit continues as straight or curved sections, or the curve 5=5b, which continues as straight sections, and/or convex and/or concave sections. The reference number 5 refers to the bend in general, and the reference numbers 5a and 5b are only used to individualise the special features of the bend. The design of different bend types will be handled in detail later. At present it is believed to be advantageous that each one of the webs 3a, 3c, 3d forming surface tear points 10 is located on the convex side K1 of the bend 5 in question, as is shown in FIGS. 2B–2D, 5B–5C, 7A and 7C. In this case the surface tearing of the invention occurs between the end 4 of the slit or slits 2 and the convex side K1 of the second slit 2 or the convex side of the bend 5, and likewise between the convex side K1 of the bend 5 of the slit 2 and the convex side K1 of the second slit 2 or the convex side of the bend 5. In the cases of FIGS. 2A, 3, 4 and 7C, each one of the webs 3a forming surface tear points 10 is located on the straight section of the second slit or slits or approximately on the straight section; and in the cases of FIGS. 5A–5B, 7B–7D and 8, each one of the webs 3b forming surface tear points 10 are located between the ends 4 of the slits, which also are good alternatives. It is also possible to arrange each one of the webs 3a, 3c, 3d forming surface tear points 10 onto the convex side K2 of the bend 5, as is shown in FIG. 7D. The surface tearing of the invention occurs then between the end 4 of the slit or slits 2 and the convex side K2 of the second slit 2 or the convex side of the bend 5. It has to be noted that, besides one or several webs of one web type 3a or 3b or 3c or 3d, each one surface tear point 10 may simultaneously have also several webs 3a and/or 3b and/or 3c and/or 3d of different types. Such a surface tear point 10 consisting of a combination of webs of different types is shown in the rightmost web point in FIG. 7A and in FIG. 7D.

FIGS. 2A–2D depict solutions of the invention, in which at least two adjacent slits 2 both contain two bends 5, which open substantially to opposite directions in a single slit. Such relatively short, hook-shaped, Z-shaped or S-shaped slits, which do not usually extend across the pattern block between its opposite sides, are here referred to as the slit 2a of the first type. A single slit may naturally extend from its one end to the side 16a or 16b of the groove. In a pattern block, such slits 2a of the first type are additionally found two or several interlaced in row 18 in uniform positions, forming webs 3a of the first type so that the principal directions D7 of the intermediate sections 7 between two bends 5 of a slit are either parallel or gradually changing their direction in a fan-shaped manner. The webs 3a of the first type are formed into points, in which the end 4 of one slit 2a meets the bend 5 or an intermediate section 7 of the adjacent slit 2a, i.e. some other point than the end, on the web width W3. The row 18 refers also to the row of nubs 8 in the pattern block 1. The principal directions D7 of the said intermediate sections 7, which may be straight, as in FIGS. 2A and 2B, or curved, as in FIGS. 2C and 2D, or bending, form the angle of deflection α in relation to the constant row direction D1 of the row, as in FIGS. 2A, 2B and 2D, or in relation to the changing local row direction D1, as in FIG. 2C. The angle of deflection α may have the angular value of 30°–90°. The row direction D1 is formed of an envelope or direct envelope, which travels through the successive surface tear points 10 corresponding to each other in the row 18, and which is identical to or parallel with the envelope passing through the middle points of successive nubs 8 in the row 18. This determination of the row direction D1 concerns all row directions mentioned in this specification. In the case of FIGS. 2A–2D, the envelopes passing through the surface tear points and the middle points of the nubs are united.

Figures 2A, 2B, 2C, 2D, 3, 11:
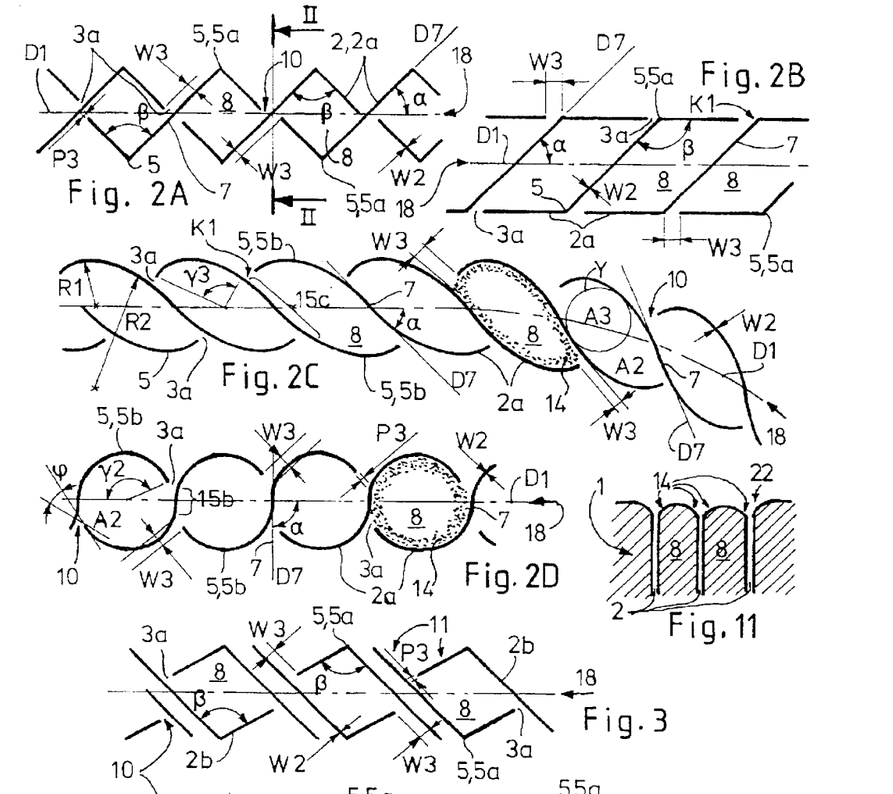
FIGS. 2A–2D present the first, second, third and fourth embodiment of the slit combinations of the tread of the invention seen from outside of the tread from the same direction as in FIG. 1, the section III enlarged.
FIG. 3 presents the fifth embodiment of the slit combinations of the tread of the invention seen from outside of the tread in the same view as in FIGS. 2A–2D.
FIG. 11 is a detailed description of the cyclically uneven surface shape of the outer surface of the tread and especially of the nubs according to the invention, separated by slits, in a tire worn at least to some extent in use, shown as a section perpendicular to the outer surface of the tread, corresponding to the FIGS. 9 and 10.

In FIG. 3 there is shown a solution of the invention, in which at least two adjacent slits 2 both contain one bend 5. Such L-shaped or V-shaped relatively short slits, which do not usually extend across the pattern block between its opposite sides, are here referred to as the slit 2b of the second type. In a pattern block, such slits 2b of the second type are found in pairs in the row 18, the slits 2b of the second type being found interlaced in the said slit pairs 11 and forming mirror-like webs 3a of the first type, in which the end 4 of one slit 2b meets the bend 5 or intermediate section 7 of the adjacent slit 2b on the web width W3. The intermediate section 7 may be either curved or bending or, as in FIG. 3, straight. In the case of FIG. 3, the envelopes passing through the surface tear points 10 and the middle points of the nubs 8 unite forming the row direction D1.

Figure 4:
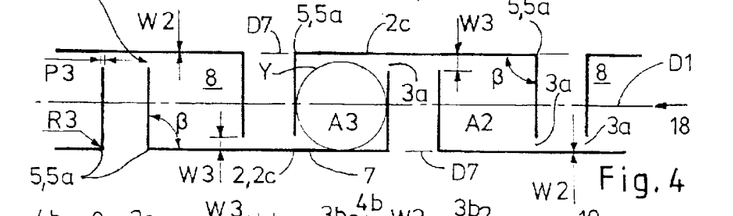
FIG. 4 presents the sixth embodiment of the slit combinations of the tread of the invention seen from outside of the tread in the same view as in FIGS. 2A–2D and 3.
Figures 5A, 5B, 6, 7A, 7B, 7C, 7D, 9, 10:
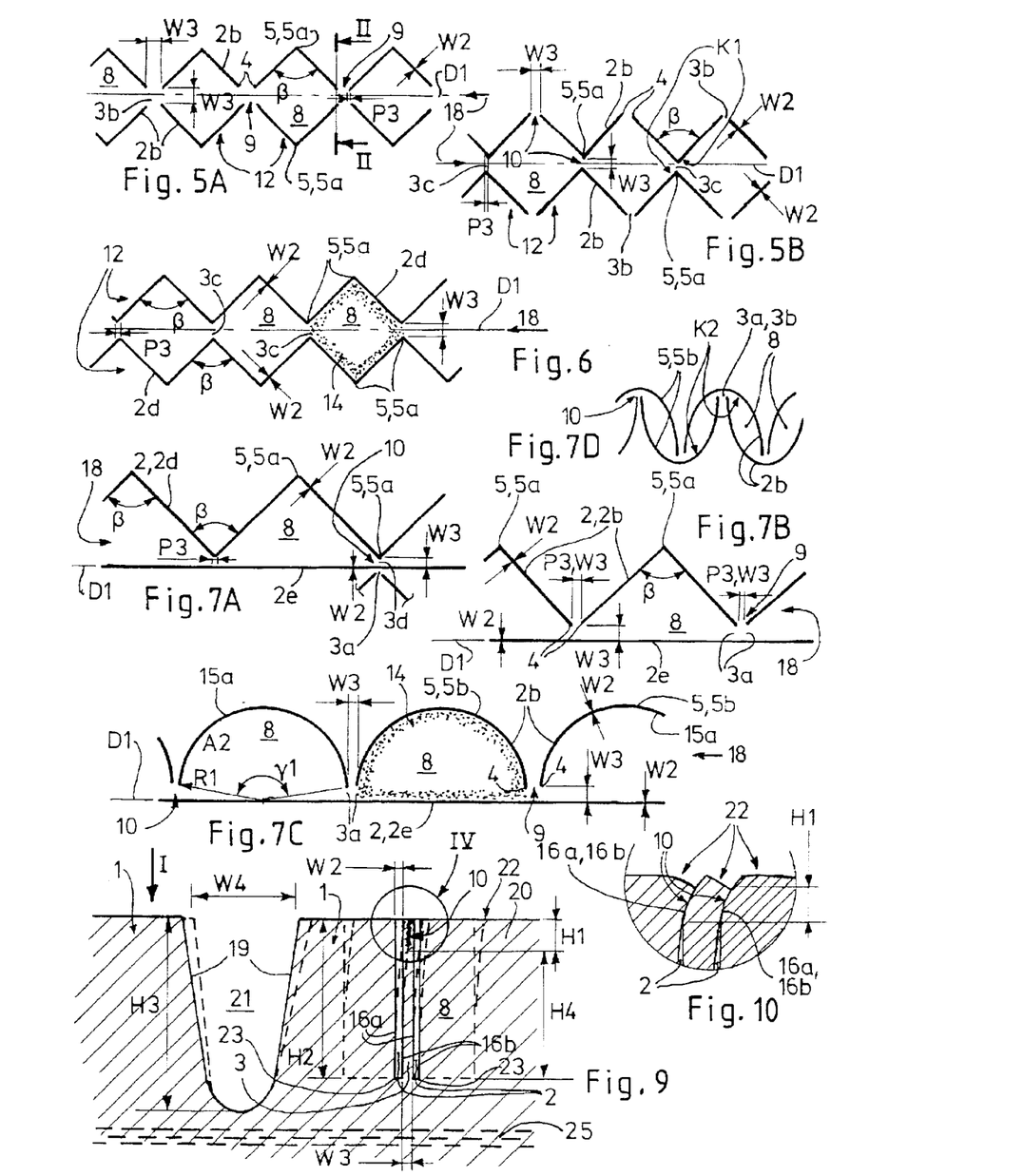
FIGS. 5A and 5B present the seventh and eighth embodiment of the slit combinations of the tread of the invention seen from outside of the tread in the same view as in FIGS. 2A–2D, 3 and 4.
FIG. 6 presents the ninth embodiment of the slit combinations of the tread of the invention seen from outside of the tread in the same view as in FIGS. 2A–2D, 3–4, and 5A–5B.
FIGS. 7A–7D present the tenth, eleventh, twelfth and thirteenth embodiment of the slit combinations of the tread of the invention seen from outside of the tread in the same view as in FIGS. 2A–2D, 3–4, 5A–5B, and 6.
FIG. 9 is a cross-section of the pattern block including the groove restricting it and two slits according to the invention, shown with unbroken line in the rest position and with broken lines during the change of speed or direction of the tire, shown as a section perpendicular to the outer surface of the tread along the plane II—II of FIGS. 1, 2A and 5A.
FIG. 10 presents a detail of the outer surface of two slits and the tread as a change in speed and/or direction is directed to the tire, shown as a section perpendicular to the outer surface of the tread in point IV of FIG. 9.

FIG. 4 presents a solution of the invention, in which at least two adjacent slits 2 both contain two bends 5, which open principally to the same direction in a single slit. Such U-shaped or [-shaped or {-shaped relatively short slits, which do not usually extend across a pattern block between its opposite sides, are here referred to as the slit 2c of the third type. In a pattern block, such slits 2c of the third type are arranged alternately interlaced and mirror-like in the row 18, thus forming webs 3a of the first type already defined above. In the slits 2c, the average directions D7 of the intermediate sections 7 between two bend points are parallel with each other and with the constant row direction D1 of the row. The intermediate section 7 may be either curved or bending or, as in FIG. 4, straight. In the case of FIG. 4, the envelopes passing through the surface tear points 10 and the middle points of the nubs 8 unite forming the row direction D1.

In FIGS. 5A–5B there is shown a solution of the invention in which at least two adjacent slits 2 both contain one bend 5, so that this concerns the slit 2b of the second type already decreed earlier. In a pattern block, such slits 2b of the second type are arranged in pairs in row, the slits 2b in the slit pairs 12 being arranged mirror-like opposed, forming—in a case in which the bends 5 in slit pairs 12 open towards each other, as in FIG. 5A—webs 3b of the second type, and/or—in a case in which the bends 5 in slit pairs 12 open away from each other, as in FIG. 5B—webs 3c of the third type. The webs 3b of the second type are formed as the ends 4 of two slits meet each other on the web width W3, and the webs 3c of the third type are formed as the bends 5 of two slits meet each other on the web width W3. The slit pairs 12 with their webs 3b or 3c form the row 18, and additionally, the said web width W3 is located between the ends 4 of the slits in the successive slit pairs 12 of the row 18 so that web combinations 9 between the slit pairs, as in FIG. 5B, or webs 3b of the second type, as in FIG. 5A, are generated. In the web combinations 9, two webs 3b of the second type thus meet each other on the web width W3 so that the web combination 9 is in a way a combination of four webs, in which web widths W3 are found at least in two directions transverse or perpendicular to each other. In the case of FIGS. 5A and 5B, the envelopes passing through the surface tear points 10 and the middle points of the nubs 8 unite forming the row direction D1.

FIG. 6 presents a solution of the invention, in which at least two adjacent slits 2 both contain three or several bends 5, which open alternately to substantially opposite directions. Such zigzag-shaped or wavelike relatively long slits are here referred to as the slit 2d of the fourth type. In a pattern block, such slits 2d of the fourth type are arranged rectilinearly in pairs, the slits in the slit pairs 12 being arranged opposed and mirror-like so that every other of the opposed bends 5 opening away from each other are found at a distance of the web width W3 from each other, forming webs 3c of the third type. The bends 3c of the third type are thus formed between the convex sections of the bends 5, as in FIG. 5B, but deviating from this, the slits 2d of the fourth type continue with bends 5 opening to opposite directions. The webs 3c are found in the row 18 corresponding to the principal direction of the slits. In the case of FIG. 6, the envelopes passing through the surface tear points 10 and the middle points of the nubs 8 unite forming the row direction D1.

In FIGS. 7A–7C there is shown a solution of the invention, in which at least one of two adjacent slits 2 is either the slit 2b of the second type containing one bend point opening towards another slit, as in FIGS. 7B and 7C, or the slit 2d of the fourth type containing three or several bend points, opening alternately substantially to opposite directions, as in FIG. 7A; and the other slit 2e of the fifth type is substantially straight and continuous, as in all the FIGS. 7A–7C. The slit 2e of the fifth type does not need to be linear, but it may be evenly curving, such as a section of a circle, ellipse, parabola, etc., or some other free arched shape; or it may also possibly be wave-form, as long as it is substantially less and more gently bending than the adjacent slit 2b, 2d of the second or fourth type. Here is thus a slit pair formed by the substantially straight slit 2e of the fifth type and the slit 2b of the second type, which has been decreed earlier, or by a number of slits; or a slit pair formed by the substantially straight slit 2e of the fifth type and the bending slit 2b of the fourth type, which has been decreed earlier. Thus, there are two alternatives for the webs. First, the ends 4 of the slit or slits 2b of the second type are found at a distance of the web width W3 from the slit 2e of the fifth type, forming webs 3a of the first type, as has been decreed earlier. If the distance of the successive webs of the first type on the measure of the slit 2e of the fifth type corresponds to the web width, web combinations 9 are formed also in this case, as in FIGS. 7B and 7D. Secondly, the bends 5 of the slit of the fourth type are found at a distance of the web width W3 from the slit 2e of the fifth type, forming webs 3d of the fourth type. The webs 3d of the fourth type are thus formed as the bends 5 meet the substantially straight slit 2e on the web width. Both the webs of the first type and the webs of the fourth type 3a, 3d form the row 18. In the case of FIGS. 7A–7C, the envelopes passing through the surface tear points 10 and the middle points of the nubs 8 do not unite, but they are parallel in relation to each other and to the slit 3e of the fifth type, forming the row direction D1.

Figure 8:
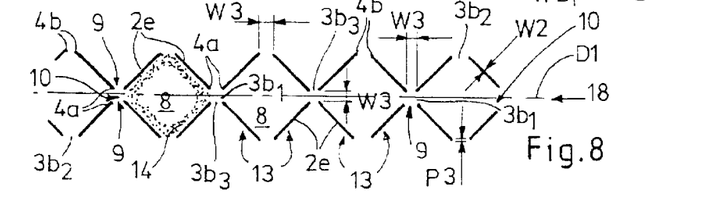
FIG. 8 presents the fourteenth embodiment of the slit combinations of the tread of the invention seen from outside of the tread in the same view as in FIGS. 2A–2D, 3–4, 5A–5B, 6, and 7A–7D.

FIG. 8 presents a solution of the invention, in which at least two adjacent slits comprise four principally straight slits 2e of the fifth type. Here both the slits adjacent to each other consist of the combination of two single slits. In the combination of two adjacent slits, the first ends 4=4a of the slits of the fifth type lie at a distance of the web width W3 from each other, forming first webs $3b=3b_1$, of the second type. Further, the slits 2e of the fifth type are found in pairs 13 in row so that their second ends 4=4b extending away from the said first webs $3b_1$ of the second type lie at a distance of the web width W3 from each other, forming second webs $3b=3b_2$ of the second type. In the row 18 between the first webs $3b_1$ of the second type of the successive slit pairs 13 there further is the said web width W3 so that web combinations 9 are formed with the third webs $3b=3b_3$ of the second type. Also in this case, the web combination 9 is in a way a combination of four webs in which web widths W3 are found at least in two directions transverse or perpendicular to each other, just as in the surface tear points corresponding to FIG. 5A. The first webs $3b=3b_1$ of the second type form the row 18. In the case of FIG. 6, the envelopes passing through the surface tear points 10 and the middle points of the nubs 8 unite forming the row direction D1. Also in this case, the reference number 3b refers to the web of the second type in general, and the more individualised reference numbers $3b_1$, $3b_2$ and $3b_3$ refer to webs of the same type in different points only for improving the understandability.

For achieving sufficient effect, each pattern block 1 contains at least one row 18 of surface tearing points 10 formed by the webs 3a–3d, and thus nubs 8 restricted by slits 2 between them. Each row contains at least two nubs 8. However, it is more preferable to provide the pattern blocks 1 with two or several said rows 18, each of which contains two or several nubs 8. Thus, the pattern block 1 contains preferably altogether at least five nubs 8. The row direction D1 of the rows 18 determined above is transverse to the circumferential direction Tc of the tire, and preferably, the row direction forms the row angle K2 90° and 45° to the circumferential direction, as can be seen from FIG. 1. The nubs have the essential length L1 and width W1 both in the circumferential direction Tc of the tire and in the lateral direction Tw of the tread. Further, the said nubs 8 are found in pattern blocks in the shoulder areas Ts of the tire and in pattern blocks in the direction of the middle parts Tm of the tire from them, such as in the circumferential rib 17 or ribs of the tread, as in the example in FIG. 1. The circumferential webs, such as the middle web, can naturally be left without the slits 2a–2e of the invention and without the nubs 8 of the invention. The nubs 8 of the invention, which are in a manner explained above, attached to the adjacent nubs 8 or the other adjacent section of the pattern block with the measure H4=H2–H1 of the webs 3a–3s changing along with the wearing down of the tire, work forming the outer surface 22 of the pattern block uneven as the pattern block 1 and the nubs 8 decline, as has been decreed earlier in connection with FIG. 10. Further, during the use of the tire, the nubs 8 wear out more strongly from their edges 14, indicated as dot ticks in FIGS. 2C, 2D, 6, 7C and 8, than from their middle sections, thus generating a structure of the outer surface 22 of the tread deviating locally from the level or an even arc, i.e. an uneven or wavelike structure, which is believed to be a reason for that that the tread of the invention has excellent grip also when worn out. This locally or cyclically uneven structure of the outer surface 22 of the tread is shown in FIG. 11.

Because the pattern blocks 1 have several nubs 8 of the invention, the area A2 of each nub is thus substantially smaller than the area A1 of the pattern block 1, for example, one third, one fourth or one fifth, or an even smaller share of the area A1 of the pattern block. However, the nubs 8 have to be larger than a certain minimum size both from their area and both dimensions perpendicular to each other in the direction of the outer surface 22. The nubs have to be of such a size and shape that the biggest possible circle to be fitted into or drawn onto the outer surface 22 in the area of slits 2 and surface tear points 10 restricting it, i.e. the circle Y found on the area A2 of the nub and touching the slit 2 restricting it at least in three points—if the nub is restricted by substantially straight slits—or at least in two points—if the nub is restricted by substantially curved slits—has an area A3 which is at least 1.7 mm², but preferably at least 3 mm², and typically 5 mm²–12 mm², when tires of a car are concerned. According to the invention, both measures L1, W1 of the nub perpendicular to each other in the direction of the outer surface 22 do not advantageously deviate too much from each other, but the total area A2 of the nub is preferably at most four or three times the area A3 of a maximum-sized circle drawn inside the nub, or typically at most double compared with the area A3 of the circle, i.e. A2≦4×A3, or A2≦4×A3, or A2=1×A3–2×A3. In tires of a delivery van, the minimum size of nubs 8 is about 1.5 times the values for the car tires, etc., i.e. the area A3 of a maximum-sized circle Y drawn inside the nubs is at least 2.5 mm² or at least 5 mm² or 7 mm²–24 mm², and respectively, the total area of the nubs relates to this area of the circle as above, i.e. A2≦4×A3, or A2≦4×A3, or A2=1×A3–2×A3. In tires of a truck or a bus, the area of the maximum-sized circle Y drawn inside the nubs is about double the values for car tires, i.e. A3 is at least 3 mm² or at least 8 mm² or between 15 mm² and 50 mm², and further respectively, the total area of the nubs relates to this area of the circle as above, i.e. A2≦4×A3, or A2≦4×A3, or A2=1×A3–2×A3. The maximum size of the nub 8, or the area A2, depends on the size of the tire, being about 40 mm² in car tires, about 60 mm² in delivery can tires, and about 100 mm² in truck tires.

In cases, in which the said bend 5 of the slits is the angle 5a, its angular value β, i.e. the angular space of the slit sections coming to the angle 5a, is at least 60° and at most 120°, and preferably, the angular value β for the said angle 5a is 80°–100°. The radius of curvature R3 for the said angle 5a is at most three times the slit width W2 of the slit (R3=3×W2) so that it is suitable to be used as a part of the web 3a, 3c and 3d forming the surface tear point 10. It is also naturally possible to form the angle 5a with a smaller radius of curvature, such as R3=2×W2 or 1×W2. Alternatively, the said bend 5 of the slits 2 is an arc 5b curving with a relatively large radius of curvature, which extends—in cases, in which the arc 5b continues as sections 15a with an unchanged radius of curvature R1—as a single shape to the first curvature χ1, the value for which is at least 150° and at most 210°, or preferably 170°–190°. Alternatively, the arc 5b extends—in cases, in which the arc 5b continues as substantially straight sections 15b—to the second curvature χ2, the value of which is at least 60° and at most 120°, or preferably 80°100°. Alternatively, the arc 5b extends—in cases, in which the arc 5b continues as sections 15c, the radiuses of curvature R2 of which are bigger than the radius of curvature R1 of the said arc 5b—to the third curvature χ3, the value for which is between the said first and second curvature χ1, χ2.

The fine grooves or slits 2a and/or 2b and/or 2c and/or 2d and/or 2e may extend to the one edge 19 or to two opposite edges 19 of the pattern block 1 and open into the grooves 21 between the pattern blocks in these points. These edges 19 of the pattern block, into which the slits 2 possibly extend, are either parallel with the circumferential direction Tc of the tire, or they form at most the angle K1=45° in relation to this.

Figure 1:
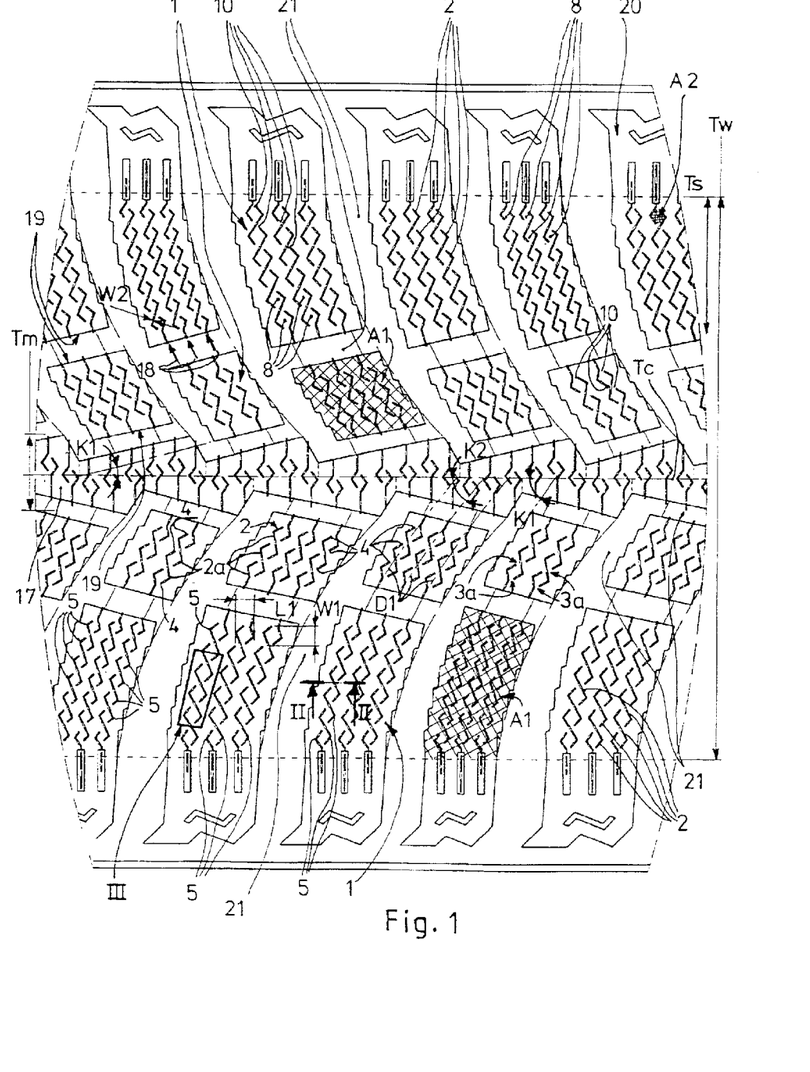
FIG. 1 presents a tread of the invention seen from outside from the direction I in FIG. 9.

The surface tear points 10 of the invention and the webs 3a–3d between the slits 2, or capillary slits, or fine grooves, generating these, may be used in treads of vehicle tires of any type, irrespective of the shapes of the surface pattern. Of these different tread designs, the surface pattern in FIG. 1 is only one example, and the invention is not restricted to this. Likewise, the designs of the slits 2 and the types of the webs may vary within wide ranges and deviate from the ones shown in the Figures.

I claim:

1. A tread of a vehicle tire comprising:
   a tread layer of rubber material having an outer surface, and the tread layer including pattern blocks separated from each other by wider grooves, and at least in part of these pattern blocks fine slits substantially narrower than the grooves and having a slit depth, each of the slits comprising within an area of the pattern block at least one bend or at least one end, wherein at least part of the pattern blocks comprises surface tear points between at least two adjacent slits, at least the two adjacent slits are both of a first slit type which includes two bends which open in substantially opposite directions, and at least both slits are interlaced in a row in uniform positions forming webs of a first type so that principal directions of intermediate sections between the two bends of the slits are either parallel or gradually changing their direction in a fan-like manner, and the row of interlaced slits is inclined with respect to a circumferential direction;
   each of the surface tear points formed by webs located between an end of at least a first adjacent slit and an intermediate section of at least a second adjacent slit; and
   nubs inside the pattern blocks defined by the adjacent slits and respective webs, the nubs having surface-areas;
   wherein the webs have a thickness and a width dimensioned according to the rubber material of the tread layer so that, as the tire is in use during driving, the web tears into a tear depth inwardly from said outer surface of the tread, the tear depth being substantially smaller than the slit depth and at least 0.5 mm, and the width of the webs being at most five times a width of the slits.

2. The tread according to claim 1, wherein the principal directions of the intermediate sections form an angle of deflection in relation to a constant row direction or a changing local row direction, the angle of deflection being between 30° and 90°.

3. The tread according to claim 1, wherein the webs that form the surface tear points are located on the convex side of the bends.

4. The tread according to claim 1, wherein the bends of the slits are in the form of one an angle or an arc, the angle formed by sides of the slit, the sides continuing as straight or curved sections of the slit, the arc continuing with one of a straight section, a convex section, or a curved section.

5. The tread according to claim 4, wherein the angle is at least 60° and at most 120°, or the angle is between 80° and 100°.

6. The tread according to claim 4, wherein the arc extends in a single configuration to a first curvature defining an angle of at least 150°, and at most 210°, or between 170° and 190°, the arc continuing as sections of unchanged radius of curvature, or a second curvature defining an angle of at least 60°, and at most 120°, or between 80° and 100°, the arc continuing as substantially straight sections, or the arc continues in sections with a third curvature that is located between the second and first curvatures, the sections having a radius of curvature that is larger than the radius of curvature of the arc.

7. The tread according to claim 4, wherein a radius of curvature of the arc is at most three times the width of the slit.

8. The tread according to claim 1, wherein the slits extend, opening to one edge or two opposite edges of the pattern block, the edges of the pattern block being parallel or at most at an angle of 45° to the circumferential direction of the tire.

9. The tread according to claim 1, wherein the pattern block includes at least five nubs having substantial length and width in the circumferential direction of the tire and in a lateral direction of the tread, the nubs being present in pattern blocks on shoulder areas of the tire and in pattern block towards the middle of the tire.

10. The tread according to claim 1, wherein the pattern block includes one or more rows of slits having a row direction transverse to the circumferential direction of the tire, and with the row direction forming a row angle between 90° and 45° in relation to the circumferential direction of the tire.

11. The tread according to claim 1, wherein the width of the webs is at most four times the width of the slit, or at most two times the width of the slit, or substantially equal to the width of the slit.

12. The tread according to claim 1, wherein a thickness of the webs is at most three times the width of the slit, or at least half of the width of the slit, or between 0.8 and 1.5 times the width of the slit.

13. The tread according to claim 1, wherein a thickness of the web and the width of the web are dimensioned according to the rubber material or materials of the tread layer so that, as the tire is in use during driving, the web tears into a depth calculated from an outer surface of the tread, the tear depth being at most 1.5 mm.

14. The tread according to claim 1, wherein the width of the webs is at most 1.5 mm and at least 0.3 mm, or the width of the web is between 0.5 mm and 1.0 mm, and a thickness of the web is at most 1.3 mm and at least 0.2 mm, or the thickness of the web is between 0.4 mm and 0.9 mm.

15. The tread according to claim 1, wherein the webs that form surface tear points connect the adjacent nubs starting from a bottom of the slits with a measure decreasing as the tire wears out, the measure being smaller than a prevailing slit depth that decreases during the wearing out of the tire on each wear level.

16. A tread for a vehicle tire having a tire carcass, comprising:
   a tread layer, the tread layer including pattern blocks separated from each other by wider grooves, and at least in part of these pattern blocks fine slits substantially narrower than the grooves and having a slit depth, each of the slits comprising within an area of the pattern block at least one bend or at least one end, wherein at least part of the pattern blocks comprises surface tear points between at least two adjacent slits, at least the two adjacent slits are both of a first slit type which includes two bends which open in substantially opposite directions, and at least both slits are interlaced in a row in uniform positions forming webs of a first type so that principal directions of intermediate sections between the two bends of the slits are either parallel or gradually changing their direction in a fan-like manner, and the row of interlaced slits are inclined with respect to a circumferential direction;

each of the surface tear points formed by webs located between an end of at least a first adjacent slit and an intermediate section of at least a second adjacent slit; and nubs inside the pattern blocks defined by the adjacent slits and respective webs, the webs connecting adjacent nubs from bottoms of the slits, a height of the webs decreasing as the tire wears out, the height being smaller than a prevailing depth of the slit that decreases during the wearing out of the tire;

wherein a surface tear point depth is defined as the distance between the slit depth and the height of the webs, the tear depth being substantially smaller than the slit depth, but at least 0.5 mm, the surface tear point depth remaining substantially constant as the tire wears out.

17. The tread according to claim 16, wherein a width of the web is at most four times the width of the slit or the width of the web is at most two times the width of the slit.

* * * * *